(12) United States Patent
Kiryu et al.

(10) Patent No.: US 6,353,865 B1
(45) Date of Patent: Mar. 5, 2002

(54) TERMINATOR WITH INDICATOR

(75) Inventors: Koichi Kiryu; Toshimichi Uchida; Kimiyo Takahashi, all of Iiyama (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/273,454

(22) Filed: Mar. 22, 1999

(30) Foreign Application Priority Data

May 25, 1998 (JP) .......................................... 10-143218

(51) Int. Cl.[7] .............................................. G06F 13/00
(52) U.S. Cl. ........................ 710/101; 710/126; 710/128; 710/129; 710/2; 710/16; 714/703; 714/724; 326/30; 326/90
(58) Field of Search ................................ 710/100, 101, 710/129, 126, 128, 16, 2; 714/703, 724; 326/30, 90

(56) References Cited

U.S. PATENT DOCUMENTS

| | | | | |
|---|---|---|---|---|
| 5,513,373 A | * | 4/1996 | Damkier | 710/16 |
| 5,568,046 A | * | 10/1996 | Samela et al. | 324/71.1 |
| 5,603,039 A | * | 2/1997 | Strevey | 713/330 |
| 5,680,555 A | * | 10/1997 | Bodo et al. | 710/126 |
| 5,751,978 A | * | 5/1998 | Tipple | 710/129 |
| 5,978,877 A | * | 11/1999 | Strevey | 710/128 |
| RE36,789 E | * | 7/2000 | Mandel et al. | 326/30 |

* cited by examiner

Primary Examiner—Rupal Dharia
(74) Attorney, Agent, or Firm—Staas & Halsey LLP

(57) ABSTRACT

A terminator for an ULTRA-2-SCSI bus has an indicator to indicate an operating mode of the bus, a connector, a terminating unit connecting data lines of the ULTRA-2-SCSI bus to terminating resistors through the connector, a mode detector detecting an operating mode of the bus according to a voltage in a differential voltage detecting line of the bus, LEDs (212, 213) and LED drivers (215, 216) driving the LED's according to the output of the mode detector. These elements are arranged in a casing consisting of upper and lower covers (201, 202). The upper cover has LED lenses (205, 206) through which light from the LEDs passes and which indicates an operating mode of the bus.

14 Claims, 11 Drawing Sheets

TERMINATOR WITH INDICATOR

BACKGROUND OF THE INVENTION

1. Field of the Invention

The present invention relates to terminators used for SCSI (small computer system interface) expansion buses for personal computers (PCs), and particularly, to a terminator with an indicator for indicating SCSI operating modes.

2. Description of the Related Art

SCSI buses were standardized by ANSI (the American National Standards Institute) in 1985 as connection buses between PCs and peripheral devices such as hard disks, CD-ROMs, optical disks, and MOs.

The SCSI buses first employed 50-pin connectors to transfer data, using 8 bits in parallel, at 5 megabytes per second. The SCSI buses included a single-ended SCSI bus and a high-voltage differential SCSI bus.

To improve the transfer rate, SCSI-2 was standardized in 1991. SCSI-2 includes FAST-SCSI that employs 50-pin connectors to transfer data, using 8 bits in parallel, at 10 megabytes per second and WIDE-SCSI that employs 50 -pin and 68-pin connectors to transfer data, using 16 bits in parallel, at 20 megabytes per second.

To further improve the transfer rate, SCSI-3was standardized in 1995. SCSI-3 includes ULTRA-SCSI that employs 50-pin connectors to transfer data, using 8 bits in parallel at 20 megabytes per second and ULTRA-WIDE-SCSI that employs 68-pin connectors to transfer data, using 16 bits in parallel, at 40 megabytes per second.

ULTRA-WIDE-SCSI was updated to ULTRA-2-SCSI that uses a low-voltage differential bus for transmitting data at 80 megabytes per second.

FIG. 1 is a connection diagram showing an ULTRA-2-SCSI bus system. An ULTRA-2-SCSI bus 10 connects SCSI devices 11, 12, and 13 to one another in a daisy chain.

The first SCSI device 11 is a SCSI board incorporated in a PC 1. The second and third SCSI devices 12 and 13 are, for example, hard disks.

The ends of the SCSI bus 10 are terminated by a first terminator 101 installed on the SCSI board 11 and a second terminator 102.

SCSI devices are classified into single-ended devices, high-voltage differential devices, and low-voltage differential devices. The ULTRA-2-SCSI bus 10 of FIG. 1 is fundamentally for the low-voltage differential devices and is capable of connecting not only the low-voltage differential devices but also the single-ended devices or the high-voltage differential devices.

Although the ULTRA-2-SCSI bus is capable of transferring data at 80 megabytes per second, the transfer rate is deteriorated to 20 megabytes per second between a PC and a single-ended or high-voltage differential device, if such a device is connected to the bus. In this case, a transfer rate between the PC and a low-voltage differential device connected to the bus is deteriorated to the transfer rate of 20 megabytes per second.

Then, the user will complain that the ULTRA-2-SCSI bus does not provide the specified transfer rate and make a claim to the manufacturer or dealer.

SUMMARY OF THE INVENTION

An object of the present invention is to provide a terminator with an indicator for indicating a ULTRA-2-SCSI bus operating mode, i.e., one of the single-ended, high-voltage differential, and low-voltage differential modes.

In order to accomplish the object, a first aspect of the present invention provides a terminator having a connector to be connected to a ULTRA-2-SCSI bus, a terminating unit that receives power from the ULTRA-2 -SCSI bus through the connector and connects data lines of the ULTRA-2-SCSI bus to terminating resistors, a mode detector that receives power from the ULTRA-2-SCSI bus through the connector and detects an operating mode of the ULTRA-2-SCSI bus among a single-ended mode, a high-voltage differential mode, and a low-voltage differential mode according to a voltage in a differential voltage detecting line of the ULTRA-2-SCSI bus, and a mode indicator that receives power from the ULTRA-2-SCSI bus and emits light in response to the detected operating mode.

The terminator of the first aspect is installed at an end of a ULTRA-2-SCSI bus and indicates an operating mode of the bus.

A second aspect of the present invention provides the terminator of the first aspect with an activity indicator for indicating whether or not the ULTRA-2-SCSI bus is receiving power from a ULTRA-2-SCSI device.

The second aspect indicates whether or not power is being supplied to the ULTRA-2-SCSI bus.

A third aspect of the present invention forms the mode indicator with light emitting diode (LED) drivers controlled by the mode detector and LEDs for emitting light under the control of the LED drivers.

The third aspect controls the LED drivers according to the output of the mode detector and the LEDs according to the outputs of the LED drivers.

A fourth aspect of the present invention installs the terminator in a casing. The casing accommodates the terminating unit, mode detector, and LED drivers. The connector is attached to a side face of the casing, and the LEDs and activeness indicator are attached to a front face of the casing.

The fourth aspect enables the terminator to be applied to a ULTRA-2-SCSI bus of a desktop PC.

A fifth aspect of the present invention installs the terminating unit, mode detector, and LED drivers on a circuit board. The connector is attached to a rear end of the circuit board, and the LEDs and activity indicator are attached to a front face of the circuit board.

The fifth aspect enables the terminator to be applied to a ULTRA-2-SCSI bus of a tower-type PC.

DESCRIPTION OF THE PREFERRED EMBODIMENTS

Figure 1:
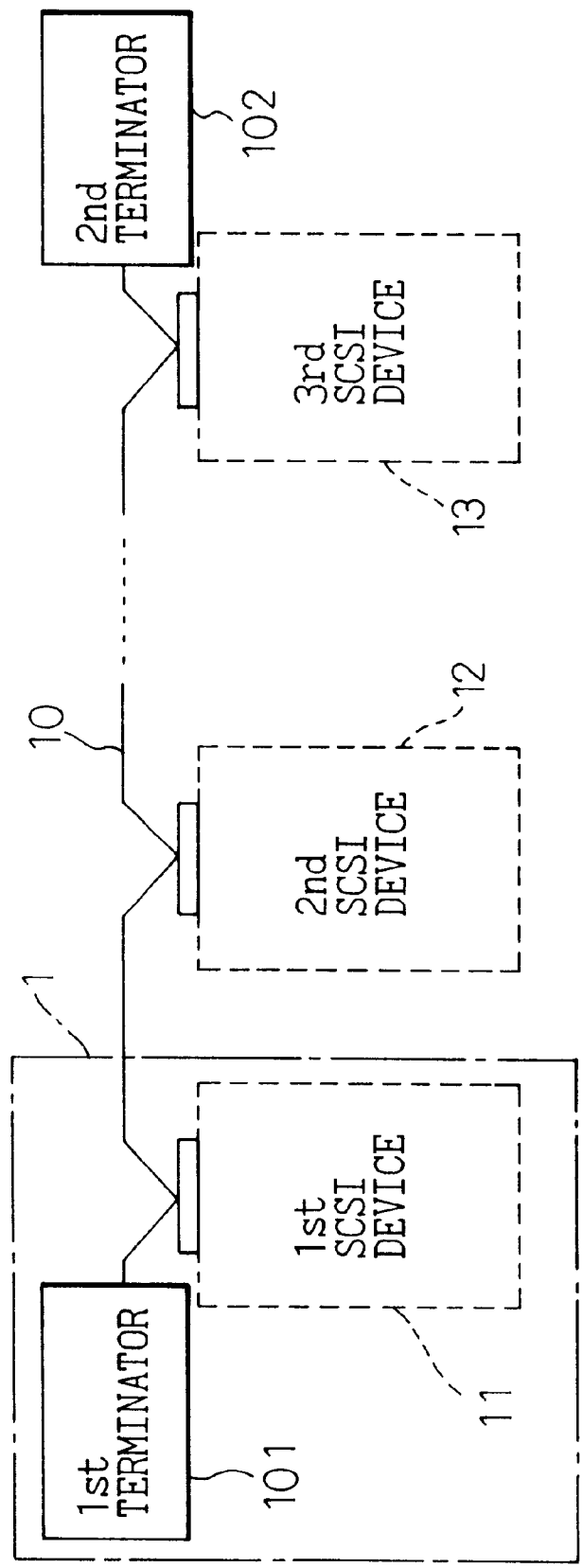
FIG. 1 is a connection diagram showing a ULTRA-2-SCSI bus system.
Figure 2:
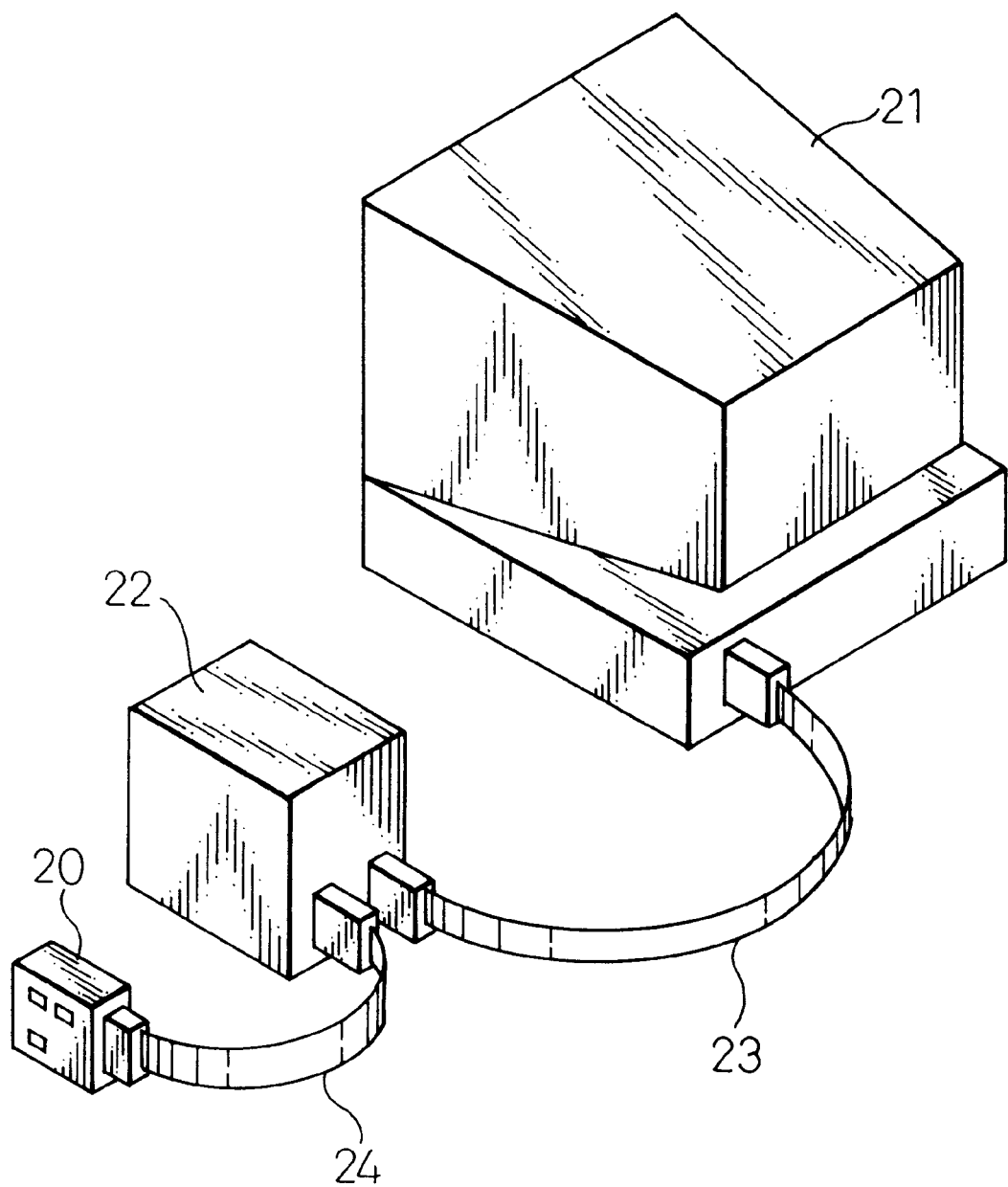
FIG. 2 is a general view showing a ULTRA-2-SCSI bus system employing a terminator according to the present invention.

FIG. 2 shows a ULTRA-2-SCSI bus system employing a terminator according to the present invention. A desktop PC 21 is connected to an external hard disk 22 through a first ULTRA-2-SCSI bus 23.

The PC 21 has a connector on the back thereof, and the hard disk 22 has an input connector. These connectors are connected to each other through the bus 23. The hard disk 22 has an output connector, which is connected to the terminator 20 through a second ULTRA-2-SCSI bus 24.

Figure 3:
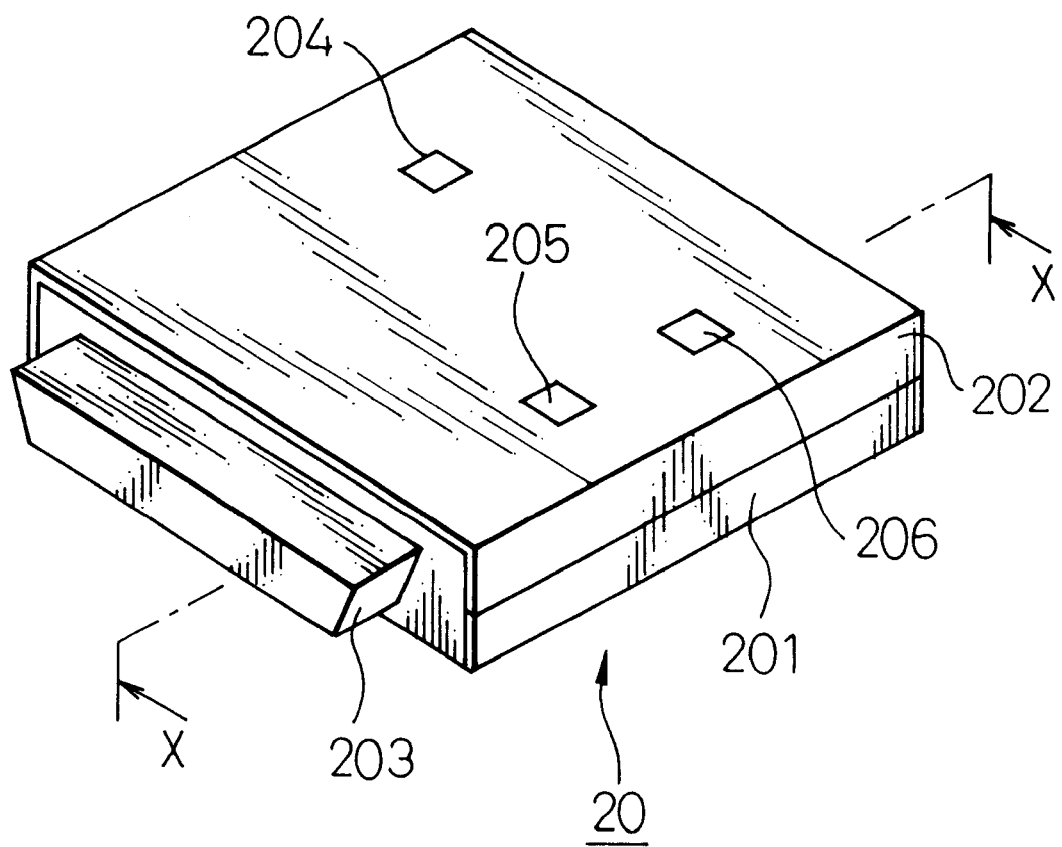
FIG. 3 is a perspective view showing the terminator of the present invention.
Figure 4:
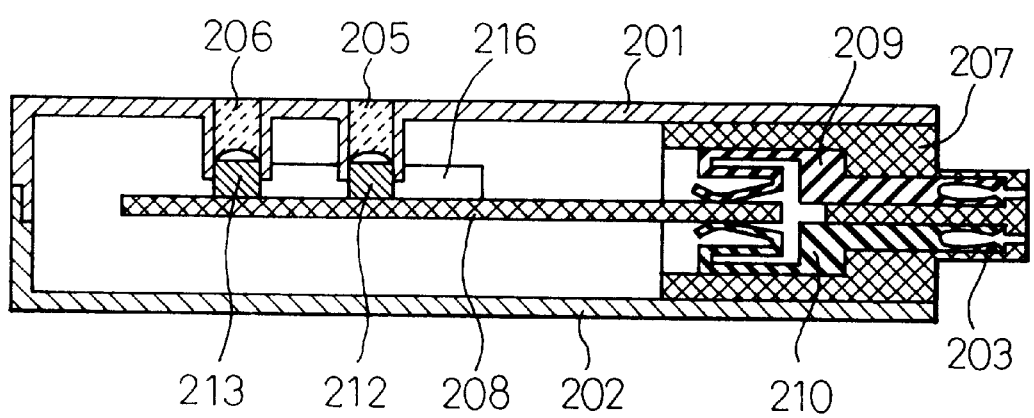
FIG. 4 is a sectional view showing the terminator of the present invention.
Figure 5:
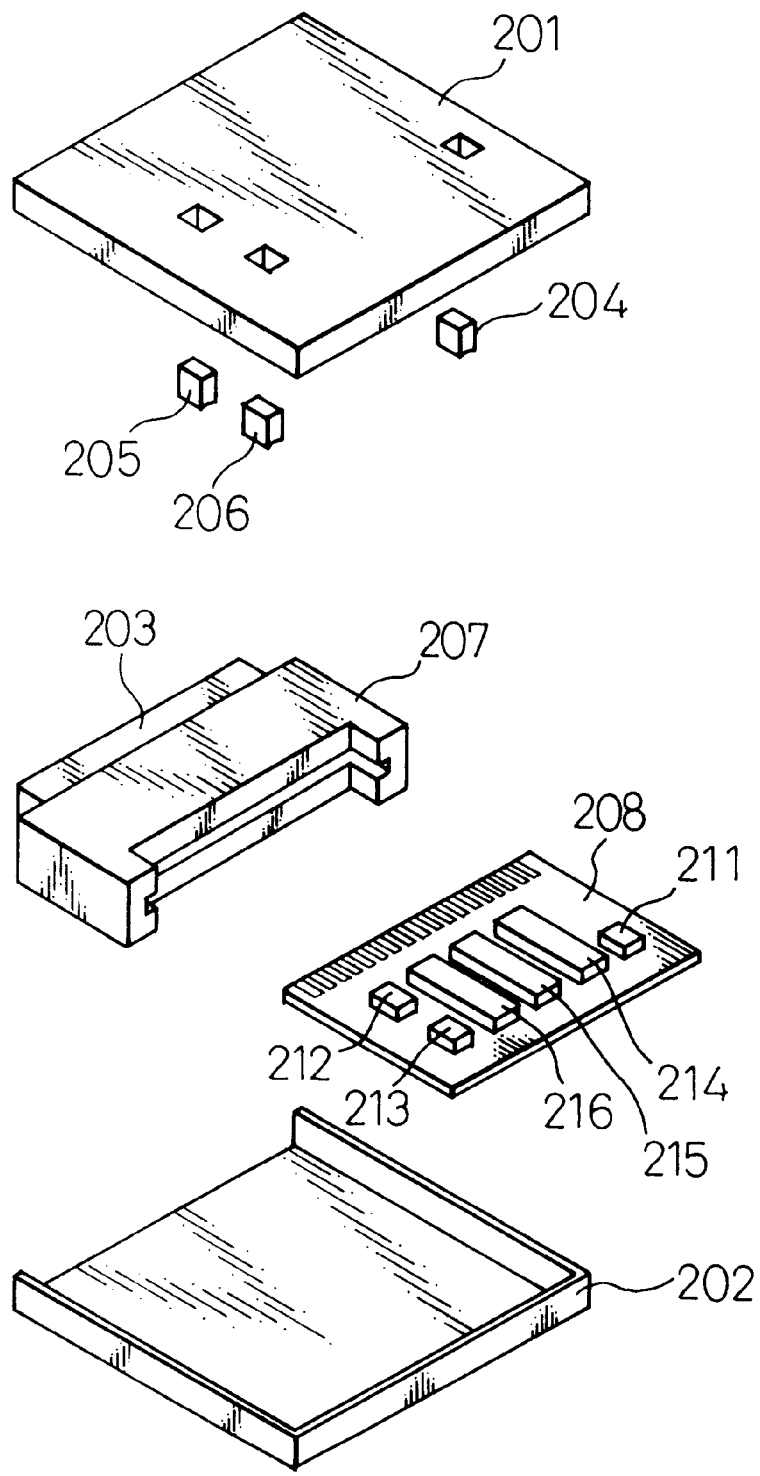
FIG. 5 is an exploded view showing the terminator of the present invention.

FIG. 3 is a perspective view showing the terminator 20, FIG. 4 is a sectional view taken along a line 4—4 of FIG. 3, and FIG. 5 is an exploded view showing the terminator 20.

The terminator 20 is accommodated in a casing that consists of an upper cover 201 and a lower cover 202. These covers hold electronic circuits to be explained later.

A side face of the casing holds a connector 203 to which the bus 24 is connected. Three LED lenses 204, 205, and 206 are embedded in the upper cover 201.

The connector 203 is attached to a side face of a base 207. Another side face of the base 207 has a receiver for a circuit board 208. Connection lines 209 and 210 are embedded in the base 207, to connect terminals of the connector 203 to terminals formed on one side of the circuit board 208, so that the bus 24 is electrically connected to an electronic circuit formed on the circuit board 208.

The circuit board 208 has three LEDs 211, 212, and 213 and three integrated circuits (ICs) 214, 215, and 216.

The terminator 20 is formed by inserting the circuit board 208 into the base 207 and by covering the base 207 with the lower cover 202 and the upper cover 201 that has the LED lenses 204 to 206.

Figure 6:
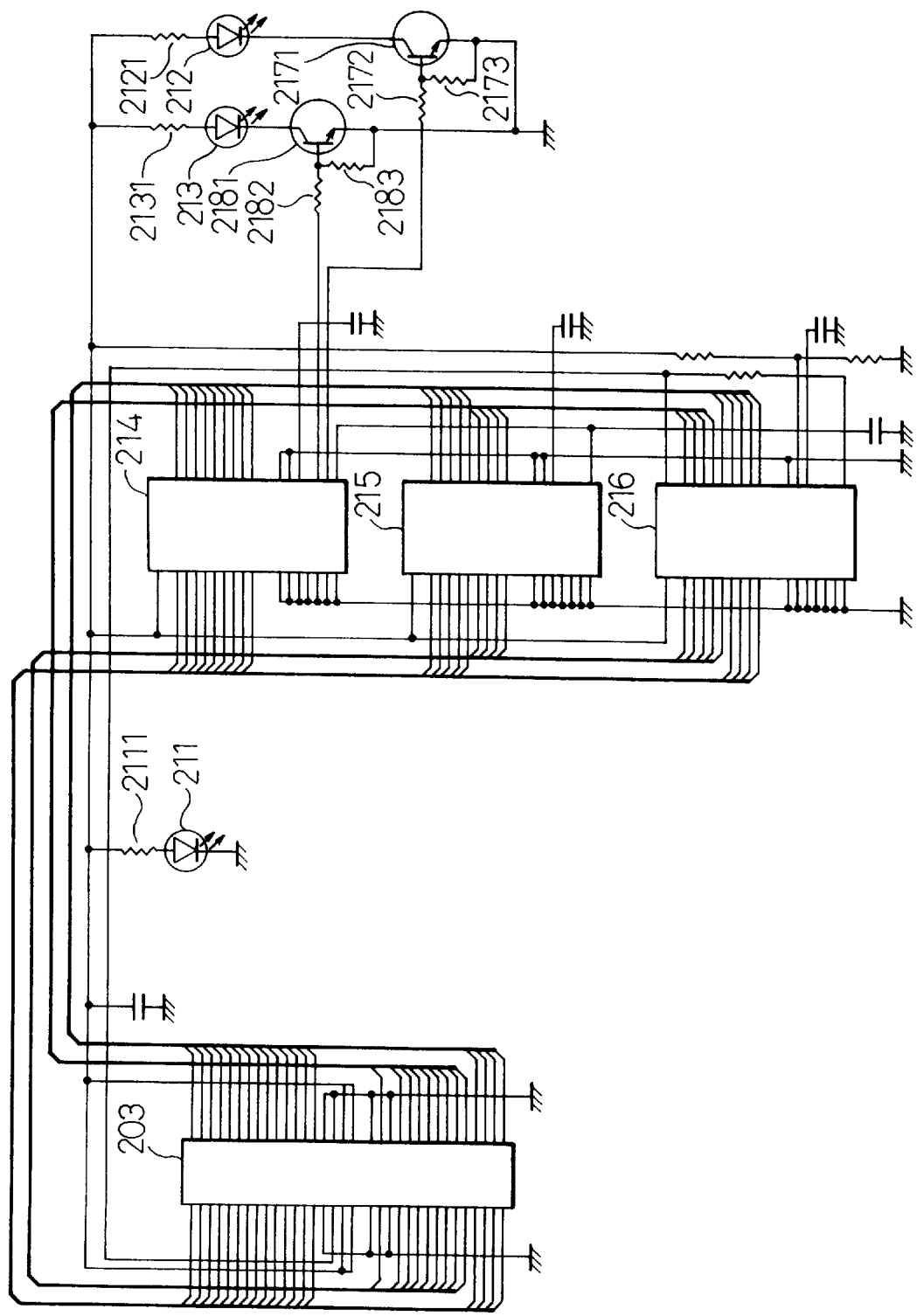
FIG. 6 is a circuit diagram showing the terminator of the present invention.

FIG. 6 shows a circuit formed on the circuit board 208.

The connector 203 has 68 pins. Among them, 54 pins are used for data transfer and the remaining 14 pins for power supply and grounding.

The 54 data lines form 27 data-line pairs so that they can transfer data even in the single-ended mode. The 27 data-line pairs are connected to the ICs 214 to 216 as nine pairs to each. The ICs 214 to 216 provide an identical function.

Figure 7:
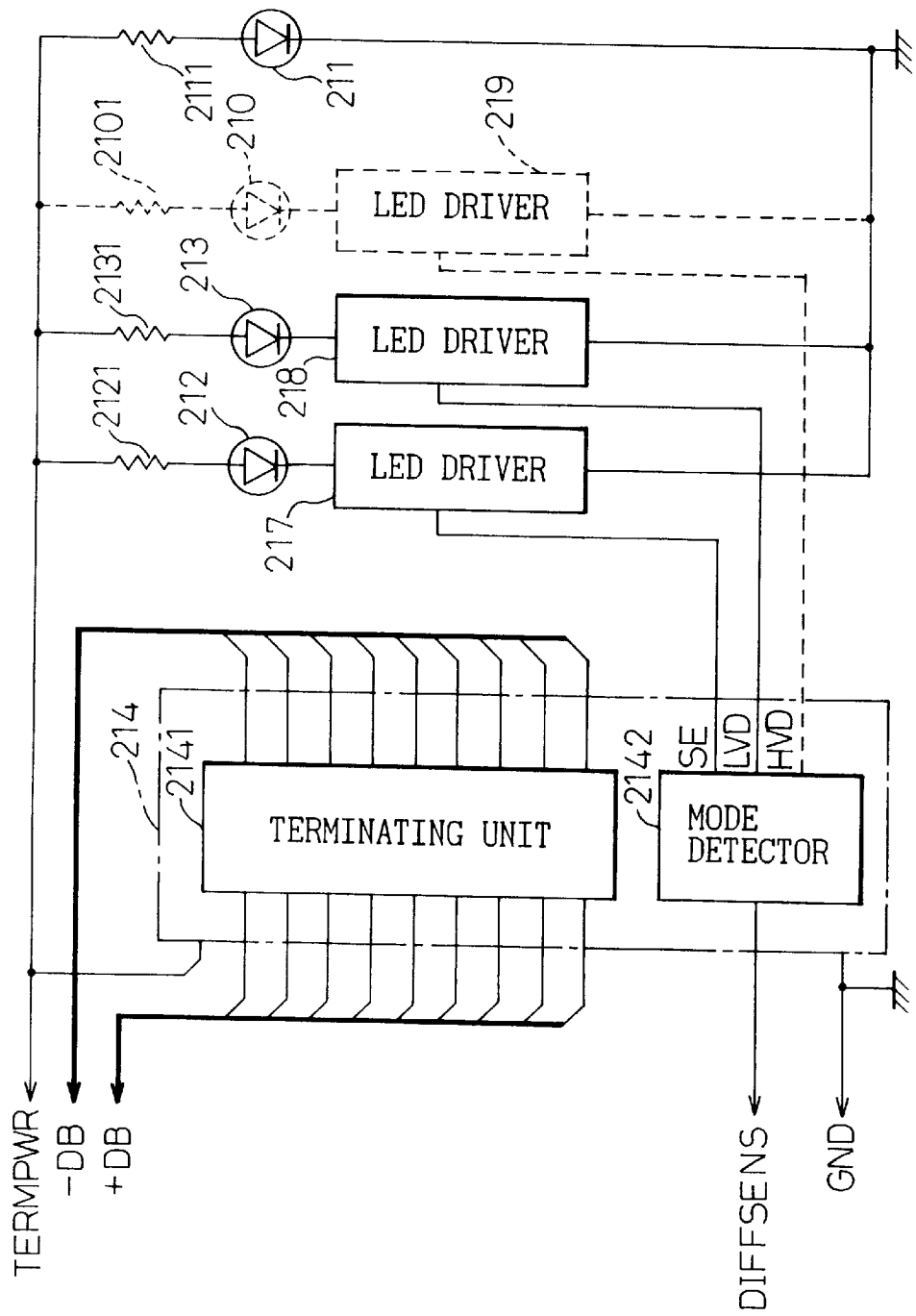
FIG. 7 is a functional diagram showing an integrated circuit contained in the terminator of the present invention.

FIG. 7 is a functional diagram showing the IC 214, which consists of a terminating unit 2141 and a mode detector 2142.

The terminating unit 2141 is connected to nine data-line pairs (+DB and −DB) to balance the impedance of the data lines.

The mode detector 2142 is connected to a differential voltage detecting line DIFFSENS, to detect an operating mode of the 27 data-line pairs among the single-ended mode, high-voltage differential mode, and low-voltage differential mode. If the operating mode is the single-ended mode, a terminal SE of the mode detector 2142 becomes high. If the operating mode is the low-voltage differential mode, a terminal LVD of the mode detector 2142 becomes high. If the operating mode is the high-voltage differential mode, a terminal HVD of the mode detector 2142 becomes high.

The IC 214 receives power through lines TERMPWR and GND.

The line TERMPWER is connected to current limiting resistors 2111, 2121, and 2131, which are connected to the anodes of the LEDs 211, 212, and 213, respectively.

The LED 211 is directly grounded, and therefore, emits light if the ULTRA-2-SCSI bus 24 is receiving power, to indicate that the bus 24 is active.

The LEDs 212 and 213 are grounded through LED drivers 217 and 218, respectively. A control terminal of the LED driver 217 is connected to the terminal SE of the mode detector 2142, and a control terminal of the LED driver 218 to the terminal LVD of the mode detector 2142.

If the bus 24 is operating in the single-ended mode, the terminal SE of the mode detector 2142 is high to turn on the LED 212 to indicate that the bus 24 is operating in the single-ended mode.

If the bus 24 is operating in the low-voltage differential mode, the terminal LVD of the mode detector 2142 is high to turn on the LED 213 to indicate that the bus 24 is operating in the low-voltage differential mode.

Figure 8:
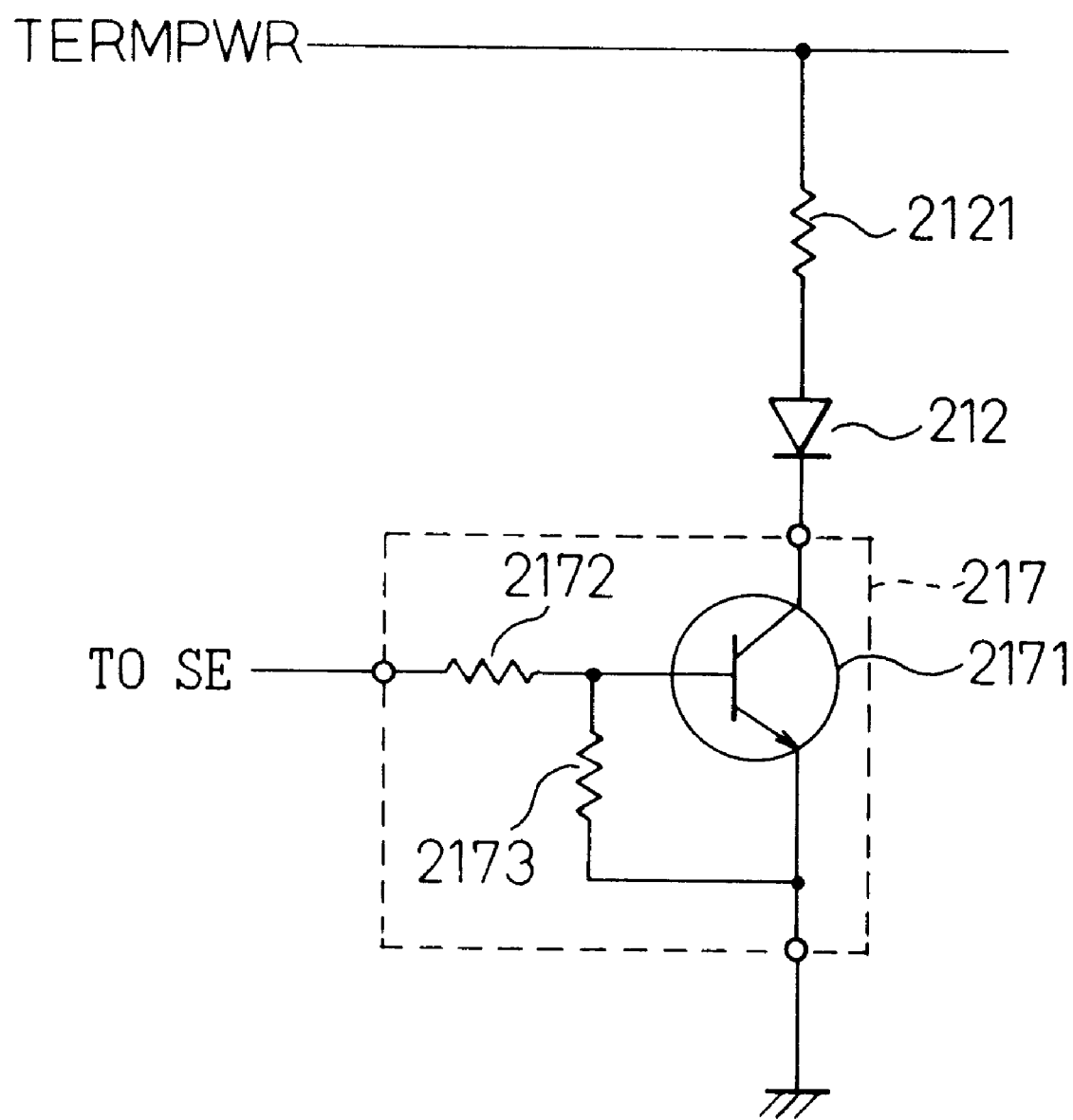
FIG. 8 is a circuit diagram showing a LED driver contained in the terminator of the present invention.

FIG. 8 is a circuit diagram showing one of the LED drivers, for example, the LED driver 217, which consists of a transistor 2171, a base resistor 2172, and a bias resistor 2173.

The LED 212 is connected to the collector of the transistor 2171. The emitter of the transistor 2171 is directly grounded, and the base thereof is connected to the terminal SE of the mode detector 2142 through the base resistor 2172. The bias resistor 2173 is arranged between the base and emitter of the transistor 2171.

If the bus 24 is operating in the single-ended mode, the terminal SE of the mode detector 2142 is high to pass a current from the IC 214 to the base of the transistor 2171. This turns on the transistor 2171 so that a collector current flows from the line TERMPWR to the ground through the current limiting resistor 2121, the LED 212, and the collector and emitter of the transistor 2171, thereby turning on the LED 212.

Similar to the LED driver 217, the LED driver 218 turns on the LED 213 if the bus 24 is operating in the low-voltage differential mode to make the level of the terminal LVD of the mode detector 2142 high.

If the bus 24 is operating in the high-voltage differential mode, it is recognizable because the LEDs 212 and 213 are both OFF.

Figure 9:
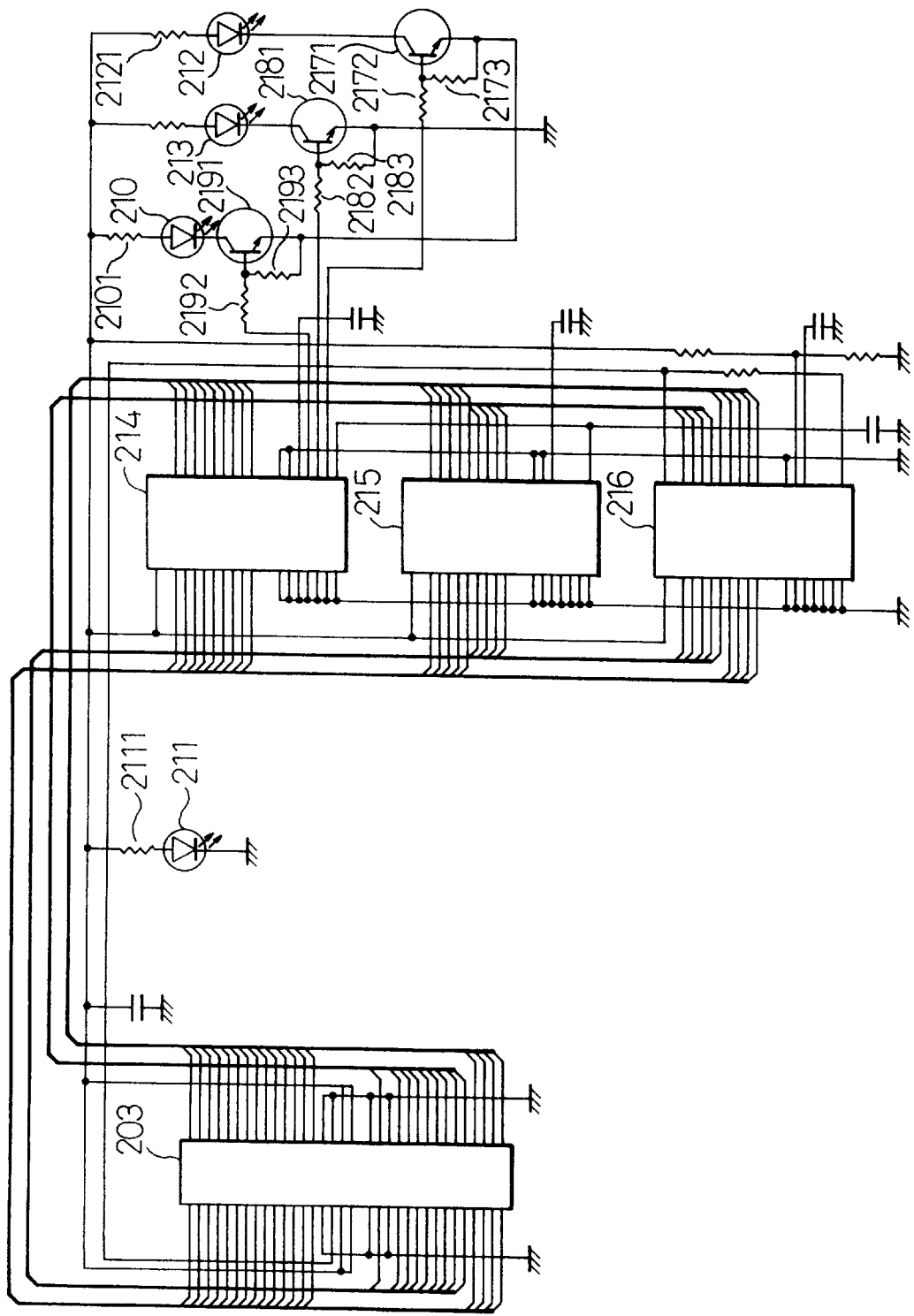
FIG. 9 is a circuit diagram showing the terminator of the present invention provided with a fourth LED.

FIG. 9 is a circuit diagram showing the terminator of the present invention provided with a fourth LED 210. The LED 210 is connected to a current limiting resistor 2101 and a LED driver 219 in series between the line TERMPWR and the ground. A control terminal of the LED driver 219 is connected to the terminal HVD of the mode detector 2142 of the IC 214, to turn on the LED 210 if the bus 24 is operating in the high-voltage differential mode.

This arrangement enables the user to know an operating mode of the ULTRA-2-SCSI bus 24 among the single-ended mode, high-voltage differential mode, and low-voltage differential mode when the bus 24 is connected to a plurality of devices and to discover the reason if the transfer rate of 80 megabytes per second of the bus 24 is not attained.

In the above examples, the PC 21 is connected to external SCSI devices. The terminator of the present invention is applicable to a tower-type PC.

Figure 10:
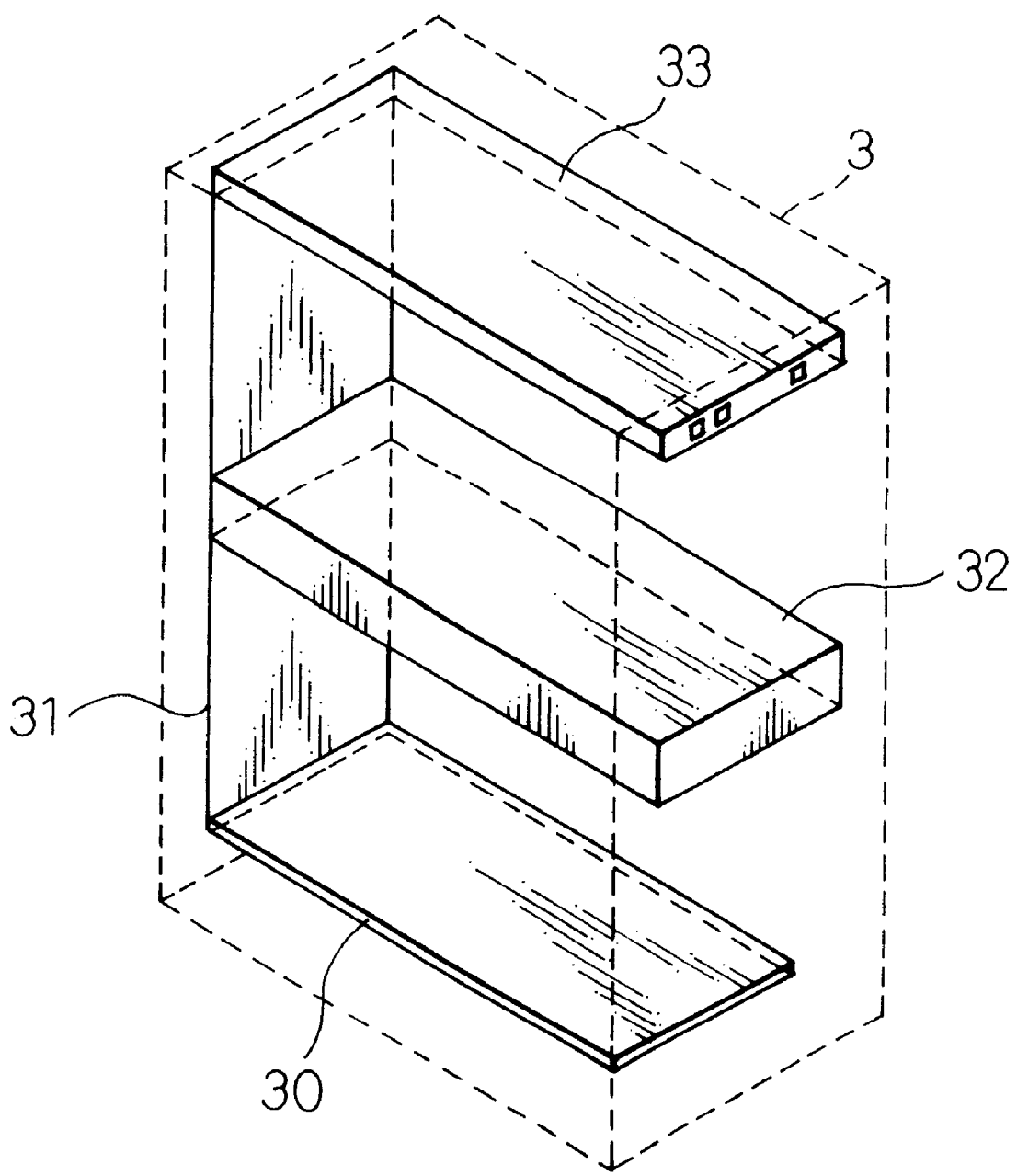
FIG. 10 is a perspective view showing a tower-type PC.

FIG. 10 is a perspective view showing an example of the tower-type PC. The PC has a casing 3. A mother board 30 is horizontally installed at the bottom of the casing 3, and a bus board 31 is vertically installed at the back of the casing 3.

The bus board 31 receives a SCSI hard disk 32 and a terminator board 33 that is provided with an indicator according to the present invention.

Figure 11:
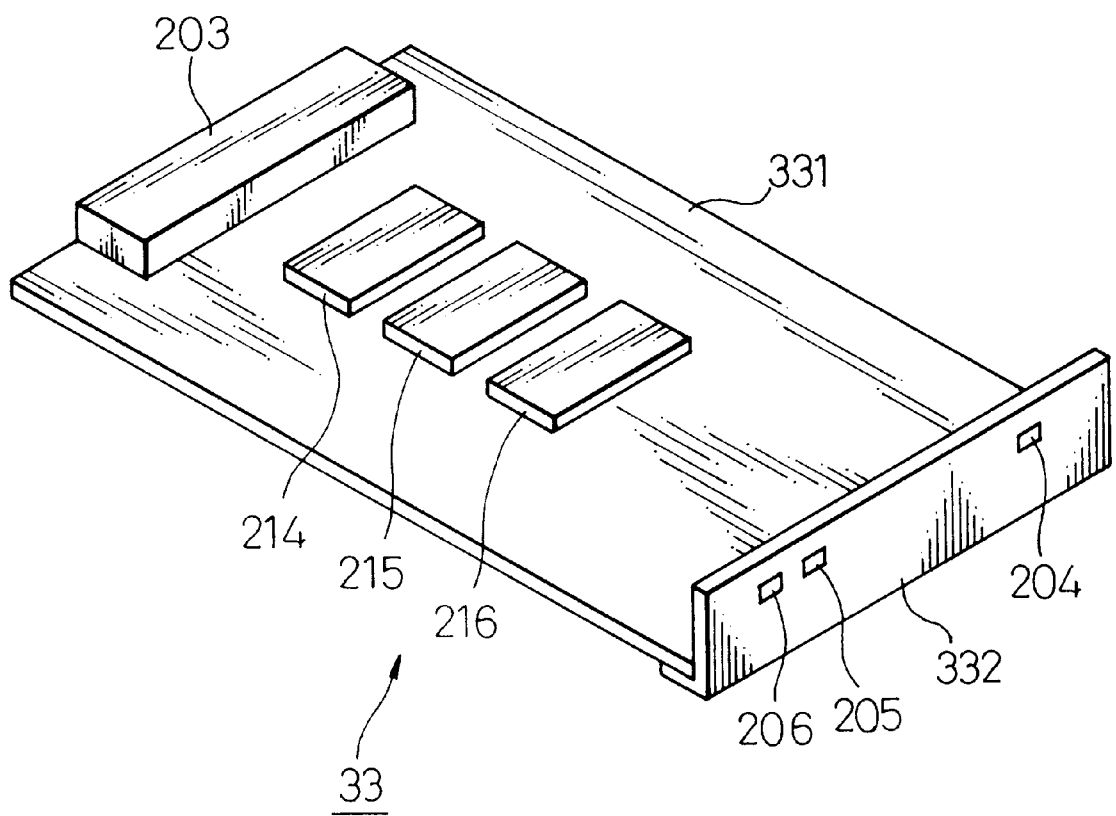
FIG. 11 is a perspective view showing a terminator board according to the present invention applicable to the tower-type PC of FIG. 10.

FIG. 11 is a perspective view showing the terminator board 33. The terminator board 33 has a circuit board 331 and a connector 203 attached to a rear end of the circuit board 331. The connector 203 is connected to the bus board 31.

A front panel 332 is vertically attached to a front end of the circuit board 331. Three LED lenses 204, 205, and 206 are embedded in the front panel 332. Three LEDs 211, 212, and 213 are arranged behind the LED lenses 204, 205, and 206, respectively. Three ICs 214, 215, and 216 are arranged on the circuit board 331. The operation of the terminator board 33 is the same as the terminator 20 of FIGS. 2 to 8.

As explained above in detail, the terminator of the first aspect of the present invention indicates the operating mode of a ULTRA-2-SCSI bus to which the terminator is attached, so that the user may easily discover the reason if the bus does not provide a designed transfer rate.

The terminator of the second aspect of the present invention enables the user to know whether or not a ULTRA-2-SCSI bus to which the terminator is attached is receiving power by observing the indicator arranged on the terminator.

The terminator of the third aspect of the present invention enables the user to know the operating mode of a ULTRA-2-SCSI bus to which the terminator is attached by observing the indicator arranged on the terminator.

The terminator of the fourth aspect of the present invention is applicable to a ULTRA-2-SCSI bus of a desktop PC.

The terminator of the fifth aspect of the present invention is applicable to a ULTRA-2-SCSI bus of a tower-type PC.

What is claimed is:

1. A terminator, comprising:

a connector to be connected to a ULTRA-2-SCSI bus;

terminating means for receiving power from the ULTRA-2-SCSI bus through the connector and connecting data lines of the ULTRA-2-SCSI bus to terminating resistors;

mode detecting means for receiving power from the ULTRA-2-SCSI bus through the connector and detecting an operating mode of the ULTRA-2-SCSI bus among a single-ended mode, a high-voltage differential mode, and a low-voltage differential mode according to a voltage in a differential voltage detecting line of the ULTRA-2-SCSI bus; and mode indicating means for receiving power from the ULTRA-2-SCSI bus and emitting light in response to the detected operating mode.

2. The terminator of claim 1, further comprising:

activity indicating means for indicating whether or not the ULTRA-2-SCSI bus is receiving power from a ULTRA-2-SCSI device.

3. The terminator of claim 1, wherein the mode indicating means comprises:

light emitting means for emitting light; and driving means, controlled by the mode detecting means for controlling the emission of light by the light emitting means.

4. The terminator of claim 3, further comprising:

a casing accommodating the terminating means, the mode detecting means, and the driving means, the connector being attached to a side face of the casing and the light emitting means and activeness indicating means being attached to a front face of the casing.

5. The terminator of claim 3, further comprising:

a circuit board arranging the terminating means, the mode detecting means, and the driving means thereon, the connector being attached to a rear end of the circuit board, and the light emitting means and the activity indicating means being attached to a front face of the circuit board.

6. The terminator of claim 2, wherein the mode indicating means comprises:

light emitting means for emitting light; and driving means, controlled by the mode detecting means, for controlling the emission of light by the light emitting means.

7. A terminator, comprising:

at least one terminating unit terminating an ULTRA-2-SCSI data-bus;

mode detecting means for detecting an operating mode of said ULTRA-2-SCSI data-bus among a single-ended mode, a high-voltage differential mode, and a low-voltage differential mode and for controlling a connection between said data-bus and said at least one terminating unit in accordance with the detected operating mode; and mode indicating means for indicating the operating mode of the ULTRA-2-SCSI data-bus, as detected by said mode detecting means.

8. A terminator comprising:

a connector to be connected to a ULTRA-2-SCSI bus;

a terminating unit receiving power from the ULTRA-2-SCSI bus through the connector and connecting data lines of the ULTRA-2-SCSI bus to terminating resistors;

a mode detector receiving power from the ULTRA-2-SCSI bus through the connector and detecting an operating mode of the ULTRA-2-SCSI bus among a single-ended mode, a high-voltage differential mode, and a low-voltage differential mode according to a voltage in a differential voltage detecting line of the ULTRA-2-SCSI bus; and a mode indicator receiving power from the ULTRA-2-SCSI bus and emitting light in response to the detected operating mode.

9. The terminator of claim 8, further comprising:

an activity indicator indicating whether or not the ULTRA-2-SCSI bus is receiving power from a ULTRA-2-SCSI device.

10. The terminator of claim 8, wherein the mode indicator comprises:

a driver controlled by the mode detector; and a light emitting device emitting light under the control of the driver.

11. The terminator of claim 9, wherein the mode indicator comprises:

a driver controlled by the mode detector; and a light emitting device emitting light under the control of the driver.

12. The terminator of claim 10, further comprising:

a casing accommodating the terminating unit, the mode detector and the driver, the connector being attached to a side face of the casing, and the light emitting device and the activity indicator being attached to a front face of the casing.

13. The terminator of claim 10, further comprising:

a circuit board mounting thereon the terminating unit, the mode detector and the driver, the connector being attached to a rear end of the circuit board and the light emitting unit and activeness indicator being attached to a front face of the circuit board.

14. A terminator, comprising:

at least one terminating unit terminating an ULTRA-2-SCSI data-bus;

a mode detector detecting an operating mode of the ULTRA-2-SCSI data-bus among a single-ended mode, a high-voltage differential mode, and a low-voltage differential mode and controlling the connection between the data-bus and the at least one terminating unit; and a mode indicator indicating the operating mode of the ULTRA-2-SCSI data-bus, as detected by said mode detector.

* * * * *